(12) United States Patent
Lee et al.

(10) Patent No.: US 9,928,007 B2
(45) Date of Patent: Mar. 27, 2018

(54) CLOCK-SKEW-TOLERANT MEMORY UPDATING

(71) Applicant: Oracle International Corporation, Redwood City, CA (US)

(72) Inventors: Jungyong Lee, San Jose, CA (US); Jinho Kwack, Santa Clara, CA (US); Tsunghsun Hsieh, Santa Clara, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 100 days.

(21) Appl. No.: 15/184,776

(22) Filed: Jun. 16, 2016

(65) Prior Publication Data
US 2017/0364305 A1    Dec. 21, 2017

(51) Int. Cl.
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0673* (2013.01)

(58) Field of Classification Search
CPC .... G06F 3/0659; G06F 3/0673; G06F 3/0604; G06F 3/0611; G06F 13/1689; H03K 19/003; G01R 31/31725
See application file for complete search history.

(56) References Cited

PUBLICATIONS

Nicolaidis, Michael, Double-Sampling Architectures, 2014, IEEE, pp. 3D.1.1-3D.1.7 (7 pages) (Year: 2014).*

* cited by examiner

*Primary Examiner* — Gary W. Cygiel
(74) *Attorney, Agent, or Firm* — Marsh Fischmann & Breyfogle LLP; Daniel J. Sherwinter; Kent A. Lembke

(57) ABSTRACT

Embodiments include systems and methods for providing robust clock-skew-tolerant memory updating in high-speed memory circuits. For example, in each memory update interval, update of a pre-memory with un-validated update data begins when a potential match is detected between a tag memory and a key (whether according to a base clock or a delayed clock); but the update data is not considered valid (nor is it written out as such) until a determination is made according to the delayed clock. The un-validated update data can be written out from the pre-memory as validated update data for the memory update interval upon detection of a data valid indication generated from the delayed hit indication.

8 Claims, 13 Drawing Sheets

CLOCK-SKEW-TOLERANT MEMORY UPDATING

FIELD

Embodiments relate generally to memory circuits, and, more particularly, to techniques for providing robust clock-skew-tolerant memory updating in high-speed memory circuits.

BACKGROUND

Memory circuits of microprocessors, and the like, typically operate according to clock signals. For example, memory operations, such as data updates, data validations, data reads, data writes, etc., can be performed by various circuits in accordance with clock edges. During operation, clock signals can manifest drift, jitter, skew, and other imperfections, which can impact the reliability of memory operations. For example, if a particular clock edge is skewed early (e.g., where clock pulse widths are inconsistent), circuit determinations and/or other operations can be performed at the wrong time and/or with incorrect information (e.g., signals that have not yet settled, etc.).

Newer fabrication techniques have tended to yield memory circuits with smaller process dimensions smaller gate sizes). Decreasing process dimensions can cause an increase in some device variations and/or in the impact of such variations on device performance. Additionally, over time, clock frequencies, data rates, and other operational speeds have experienced large increases. These and other changes in memory circuit operating conditions can tend to increase the impact of clock skew on performance. For example, smaller process dimensions and increased operating frequencies can impact signal propagation timing, can reduce time available for signal changes to settle and/or to perform certain circuit functions, etc. Such performance impacts can cause data errors and/or other undesirable results.

BRIEF SUMMARY

Among other things, embodiments provide novel systems and methods for providing robust clock-skew-tolerant memory updating in high-speed memory circuits. It is desirable to ensure that memory (e.g., microprocessor cache and/or other memory) is updated with valid data. In some contexts, clock skew can impact timing of certain determinations in a memory update structure that can result in improper determinations of data validity. Embodiments described herein can make reliable data validity determinations in the presence of clock skew, even for high-speed memory circuits. In each update interval (e.g., one or more clock unit intervals), update of a pre-memory begins as soon as a potential match is detected between a tag memory and a key (whether according to a base clock or a delayed clock); but the update data is not considered valid (nor is it written out as such) until a determination is made according to the delayed clock. For example, in each memory update interval, some embodiments update a pre-memory with un-validated data upon detection of either (or both) of a hit indication or a delayed hit indication. The hit indication and the delayed hit indication can be generated in association with the memory update interval when a key signal matches a tag memory signal, where the match is determined for the memory update interval at a clock signal transition time or at a delayed clock transition time, respectively. The un-validated data can be written out from the pre-memory as validated data for the memory update interval upon detection of a data valid indication generated from the delayed hit indication.

According to one set of embodiments, a method is provided for clock-skew-tolerant memory updating. The method includes: generating a hit indication in association with a memory update interval when a key signal matches a tag memory signal at a first clock signal trigger time in the memory update interval; generating a delayed hit indication in association with the memory update interval when the key signal matches the tag memory signal at a first delayed clock signal trigger time in the memory update interval; triggering updating of a pre-memory with un-validated data for the memory update interval in response to detecting either of the hit indication or the delayed hit indication; triggering a data valid indication for the memory update interval in response to detecting at least the delayed hit indication; and reading out the un-validated data from the pre-memory as validated data for the memory update interval in response to detecting the data valid indication for the memory update interval at a second clock signal trigger time in the memory update interval.

According to another set of embodiments, a memory update structure is provided. The memory update structure includes a data validation sub-structure, which has: a clock signal input; a delayed clock signal input that is a delayed version of the clock signal input; a match signal input that is HIGH when a tag memory signal matches a key signal, and is LOW otherwise; a write enable signal output; and a data valid signal output. In a given memory update interval of the clock signal input: the write enable signal output is triggered HIGH in response to the match signal being HIGH at a trigger time of either the clock signal input or the delayed clock signal input; and the data valid signal output is HIGH when the match signal is HIGH at the trigger time of at least the delayed clock signal input.

According to another set of embodiments, another memory update structure is provided. The memory update structure includes means for updating a pre-memory with un-validated data when at least one of a hit indication or a delayed hit indication is detected, the hit indication generated in association with a memory update interval when a key signal matches a tag memory signal at a clock signal transition time for the memory update interval, and the delayed hit indication generated in association with the memory update interval when the key signal matches the tag memory signal at a delayed clock signal transition time for the memory update interval. The memory update structure further includes means for reading-out of the un-validated data from the pre-memory as validated data in association with the memory update interval when a data valid indication for the memory update interval is detected, the data valid indication generated for the memory update interval in response to detecting the delayed hit indication.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Memory circuits of microprocessors, and the like, typically operate according to one or more clock signals having associated one or more clock frequencies (e.g., data rates). For example, certain components of a circuit can perform a function in response to detecting a clock transition a rising edge, a falling edge, a rising or falling edge, etc.). Often, a circuit can be designed to perform multiple steps in the time interval between each clock transition (referred to herein as "clock unit interval"). Non-idealities of clock signals, such as clock skew, can result in different clock unit interval durations over time. Shortened clock unit interval durations can, at times, have undesirable impacts on circuit performance. For example, as data rates and/or signal propagation times increase, there may be insufficient time for a circuit to carry out a particular set of steps in a shortened clock unit interval or certain circuit functions may use incorrect data (e.g., data that has not yet been updated, has not settled, etc.).

One type of circuit that can be impacted in such ways by clock skew is a memory update structure. In general, memory update structures can be used to help ensure that memory is being updated with valid data (e.g., that the correct data is being read into the correct memory location during an update). The time allotted for a single memory update is referred to herein as a "memory update interval." Typically, a single memory update interval can include two or more clock unit intervals. For example, a memory update structure can receive update-related signals to trigger the update in a first clock unit interval, can temporarily read un-validated update data and/or validate the update during at least a second clock unit interval, and can read out the update data to a memory location in a third clock unit interval. Various implementations can operate according to different timing.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
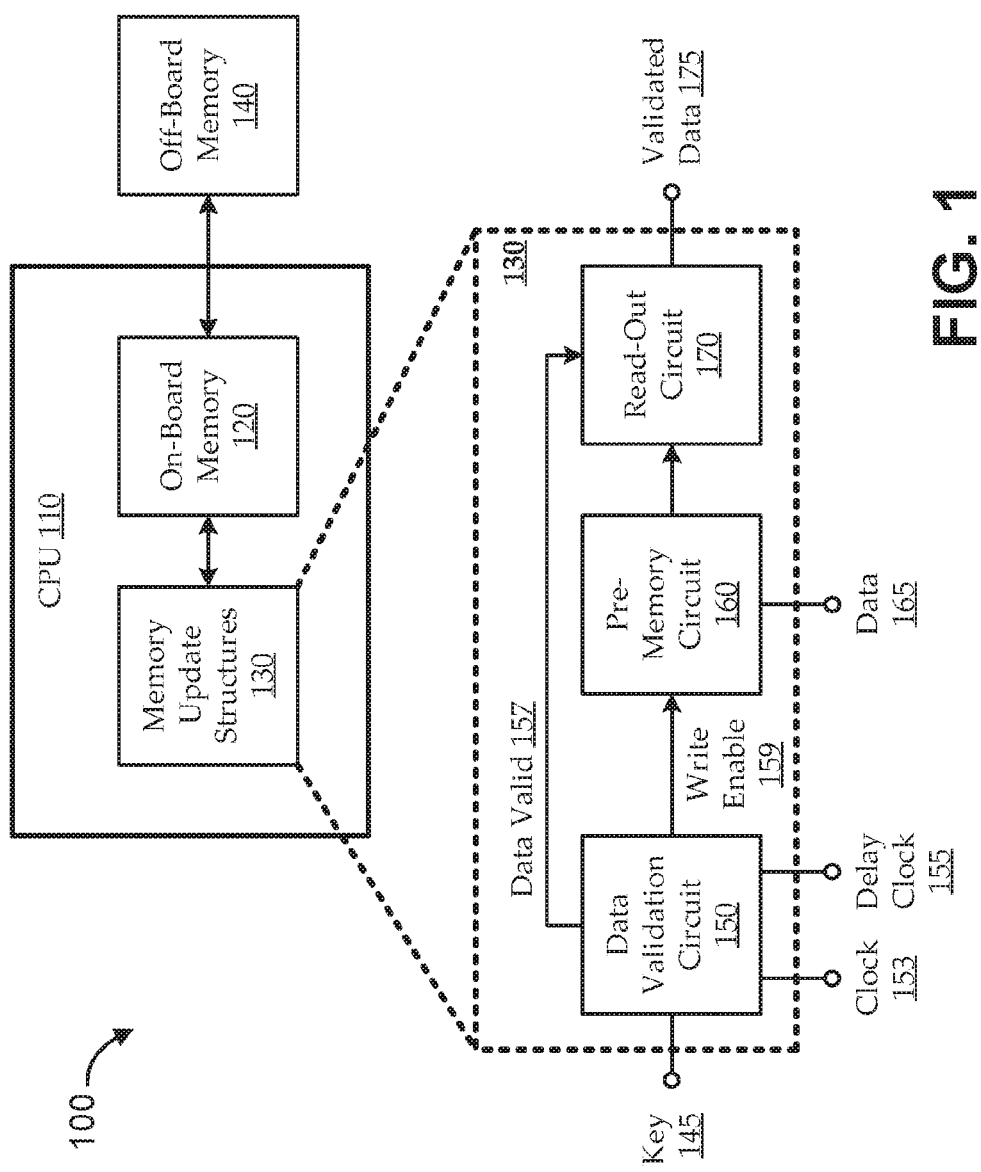
FIG. 1 shows a block diagram of an illustrative microprocessor environment, as a context for various embodiments.

FIG. 1 shows a block diagram of an illustrative microprocessor environment 100, as a context for various embodiments. As illustrated, a central processing unit (CPU) 110, or any other microprocessor, or the like, can include on-board memory 120, such as one or more levels of cache, register files, etc. Certain on-board memory 120 can be coupled with off-board memory 140. The on-board memory 120 can be updated by memory update structures 130. For example, when it is desired to update data 165 in a particular memory location of the on-board memory 120, the update data 165 can be sent to a memory update structure 130. Prior to writing the update data 165 out to the on-board memory 120 location, the memory update structure 130 can validate the update data 165 (e.g., to help ensure that the correct memory location is being updated with the correct data, etc.). For example, each memory update structure 130 can include a data validation circuit 150 to validate the update data. 165, a pre-memory circuit 160 to hold the update data 165, and a read-out circuit 170 to output the update data 165 to the on-board memory 120 from the pre-memory circuit 160 once it has been validated by the data validation circuit 150.

Conventional memory update structures tend not to be robust to clock skew, particularly at high data rates. For example, when clock skew shortens the duration of a clock unit interval, some conventional data validation circuits 150 can tend to make validation determinations too early (e.g., potentially based on unsettled or otherwise incorrect data). Certain conventional approaches attempt to delay such determinations to avoid making the determinations too early when there is clock skew, but such approaches can tend to leave pre-memory circuits 160 and/or other portions of the memory update structures 130 with too little time to perform their functions (e.g., the remainder of the memory update interval can be too short). Some examples of such conventional approaches are described below.

Embodiments described herein can use both a clock signal 153 and a delayed clock signal 155 to perform memory update structure 130 functions. For example, a write enable signal 159 can be updated according to either of the clock signal 153 or the delayed clock signal 155, thereby permitting early triggering of a pre-memory circuit 160 update (e.g., which can maintain sufficient time for the update in a memory update interval). However, a data valid signal 157 can be updated only according to the delayed clock signal 155, which can delay validation of the update data 165 in the memory update interval (e.g., to avoid making validation determinations too early in the memory update interval).

Figure 2:
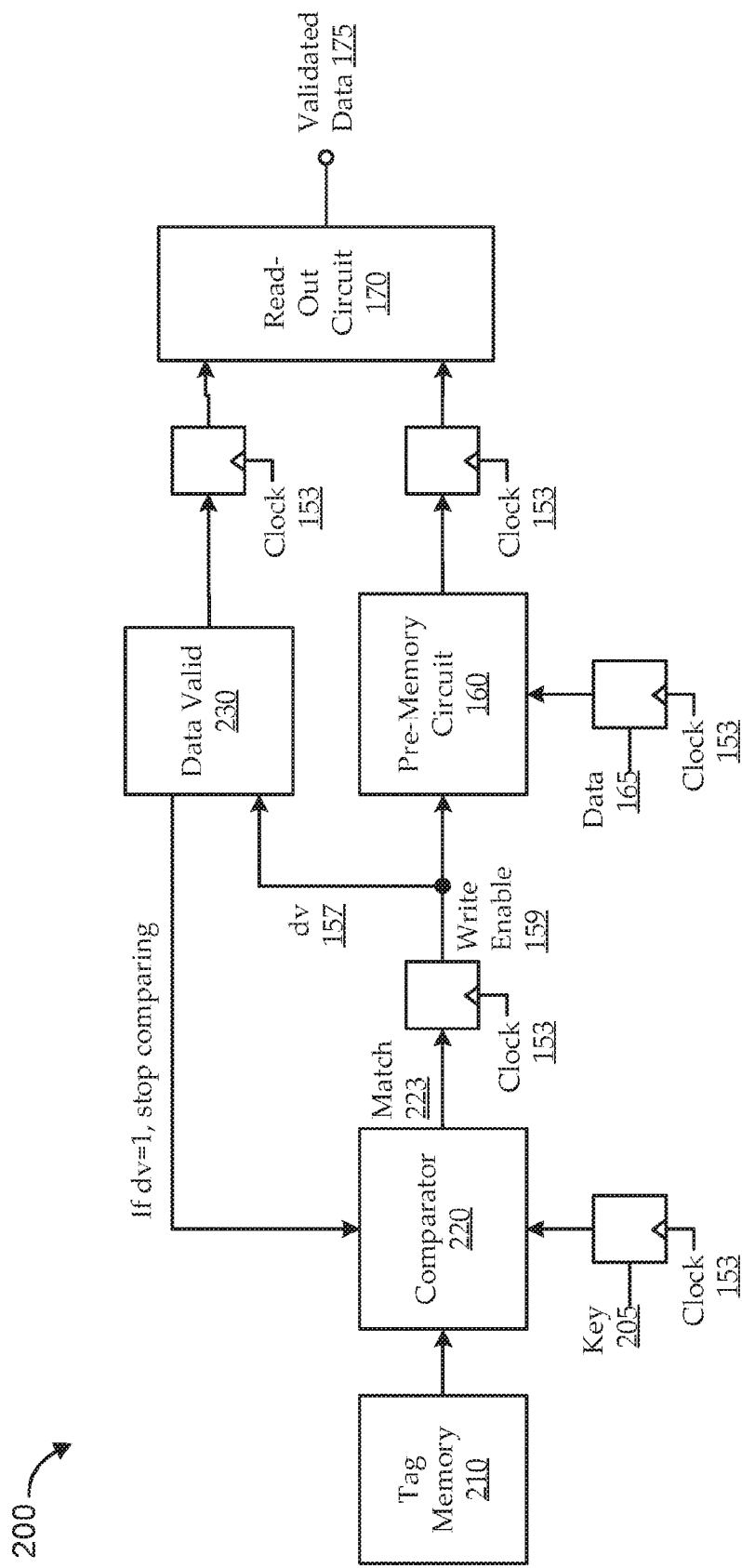
FIG. 2 shows an illustrative conventional memory update structure.

For the sake of context, FIG. 2 shows an illustrative conventional memory update structure 200. As illustrated, various functions of the memory update structure 200 can be triggered by a clock signal 153. A tag memory 210 can be used to identify a particular memory location that is currently stored in a cache, or the like. When data is transferred (e.g., from a particular memory to a cache), the transfer can include both the data to be transferred (e.g., update data 165) and a memory location indicator (e.g., key 205). Before updating the cache with the update data 165, the memory update structure 200 can be used to validate that the memory location indicator matches the particular memory location associated with the cache location being updated (i.e., that the intended cache location is being updated). As illustrated, a comparator 220 can compare a received key 205 with a value received from a tag memory 210 to make such a determination. If the location indicated by the key 205 matches the value provided by the tag memory 210, a match signal 223 output of the comparator 220 can indicate a match (e.g., '1'). Otherwise, the match signal 223 output can indicate no match (e.g., '0').

At a next clock unit interval (e.g., at a next rising clock edge of the clock signal 153), the match signal 223 can update a write enable signal 159 as an input to a pre-memory circuit 160, and a data valid signal 157 as an input to a data valid circuit 230. When the write enable signal 159 is HIGH (i.e., when a match was detected by the comparator 220), the pre-memory circuit 160 is updated with the update data 165 (un-validated). When the data valid signal 157 is HIGH (i.e., when a match was detected by the comparator 220), the data valid circuit 230 can output a data valid indication (e.g., dv='1'). In some implementations, when there is a data valid indication, the comparator 220 operation can be suspended (e.g., until the next memory update interval). At a next clock unit interval, the un-validated update data 165 and the data valid signal 157 can be provided to a read-out circuit 170, which can effectively read out the un-validated update data 165 from the pre-memory circuit 160 as validated data 175 when the data valid signal 157 indicates validity.

Figure 3:
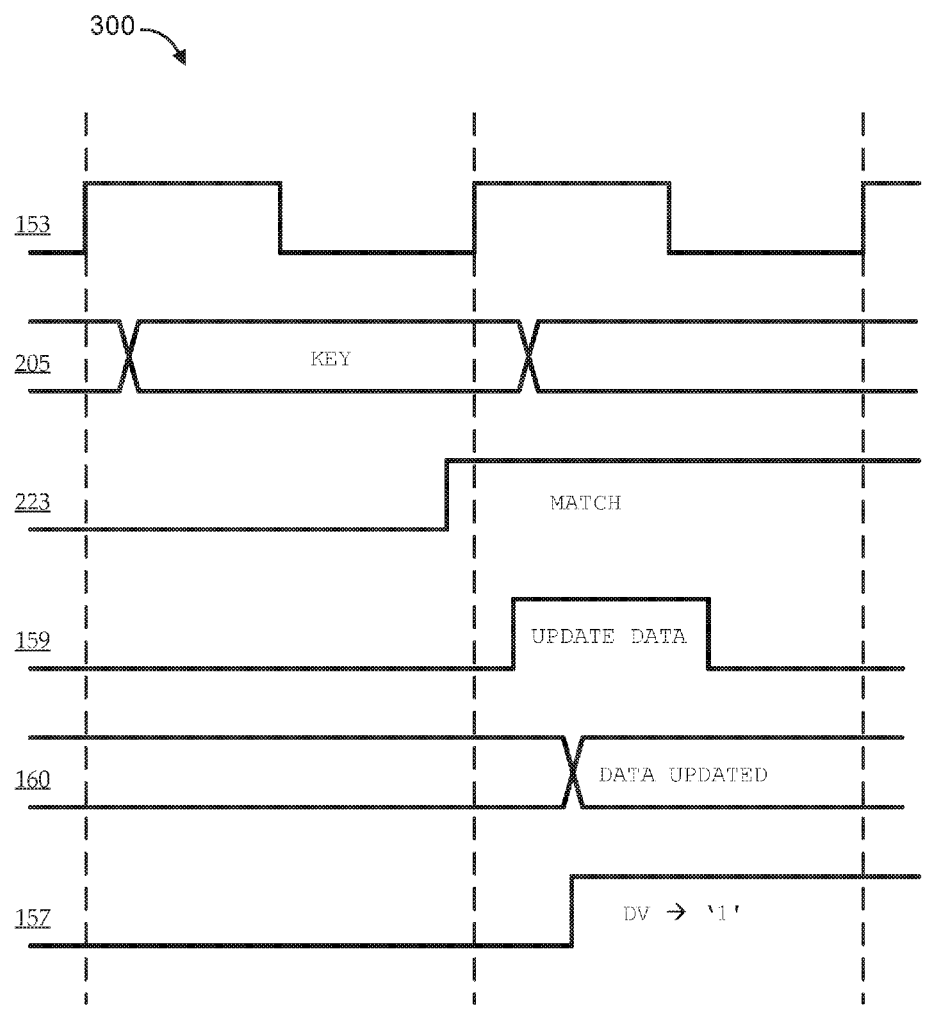
FIG. 3 illustrates signal timing for the memory update structure of FIG. 2 for a "match" case without clock skew.

While such a conventional memory update structure can operate reliably in some contexts, it may not be robust to clock skew, particularly at high data rates, FIGS. 3-6 show multiple cases of illustrative signal timing for the memory update structure 200 of FIG. 2 to demonstrate certain features and limitations of such conventional implementations. FIG. 3 illustrates signal timing 300 for the memory update structure 200 of FIG. 2 for a "match" case without clock skew. Two clock unit intervals are shown for clock signal 153 (two clock pulses). During the first clock unit interval, a key signal 205 is received, and there is a match, as indicated by match signal 223 going HIGH. As illustrated, it takes much of the first clock unit interval for the match signal 223 to update, but the match signal 223 does update prior to the second clock unit interval (i.e., at the start of the second clock unit interval, the match signal 223 indicates a match). In the second clock unit interval, in response to the HIGH match signal 223, the write enable signal 159 and the data valid signal 157 both go HIGH. Accordingly, the pre-memory circuit 160 is updated (with the update data 165), and the data can be read out as validated data in the next clock unit interval. In such an instance, the memory is updated properly.

Figure 4:
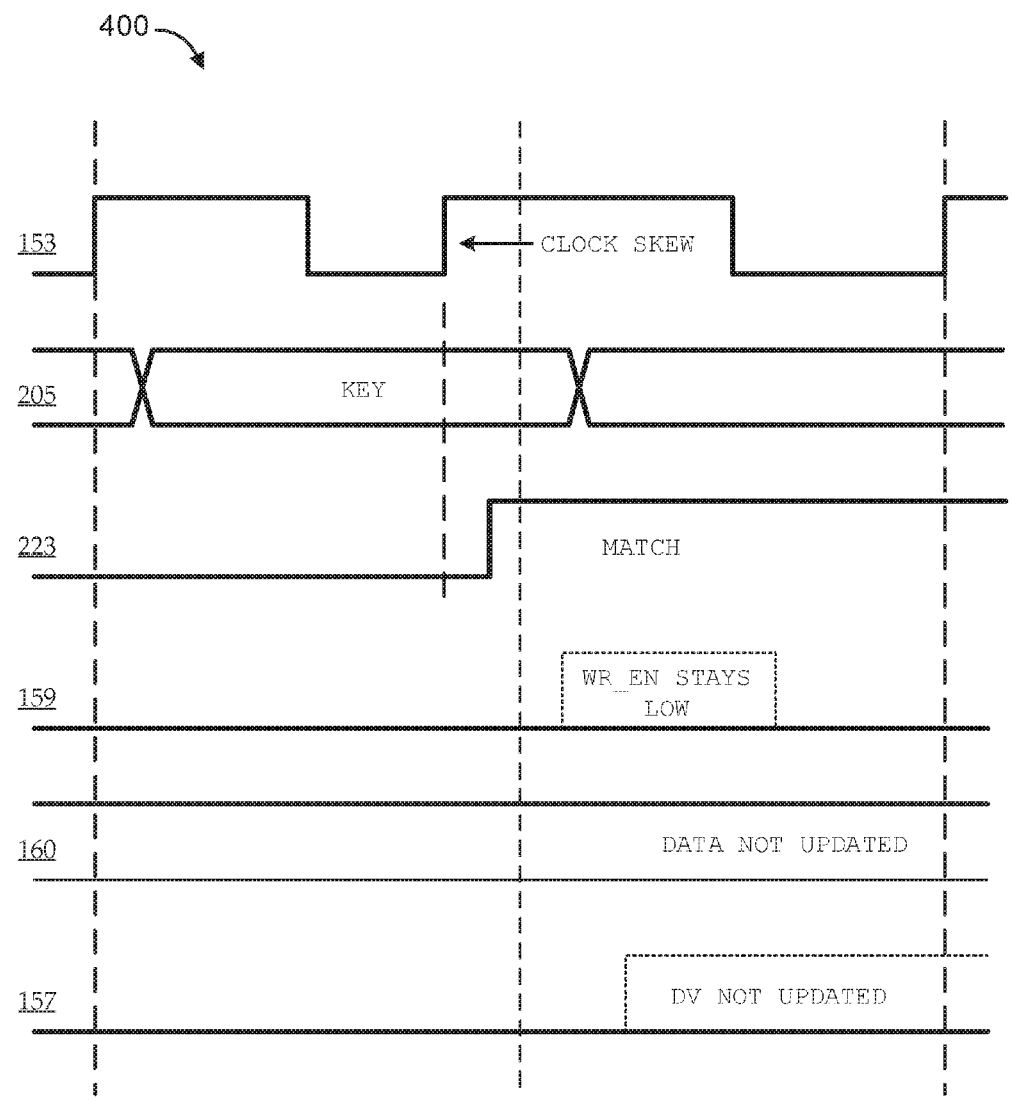
FIG. 4 illustrates signal timing for the memory update structure of FIG. 2 for a "match" case with clock skew.

FIG. 4 illustrates signal timing 400 for the memory update structure 200 of FIG. 2 for a "match" case with clock skew. As illustrated, FIG. 4 is similar to FIG. 3, except that clock skew causes the second clock unit interval to begin prematurely (i.e., the rising edge of the clock signal 153 is shifted to the left), so that the first clock unit interval is shorter than nominal and the second clock unit interval is longer than nominal. As in FIG. 3, during the first clock unit interval, a key signal 205 is received, and there is a match, as indicated by match signal 223 going HIGH. Because of the skewed-early start of the second clock unit interval, the match signal 223 is sampled before it transitions to HIGH (i.e., while it is still LOW from a previous memory update interval). Accordingly, the write enable signal 159 and the data valid signal 157 both fail to update, and the pre-memory circuit 160 is not updated (with the update data 165). This can result in a memory update failure.

Figure 5:
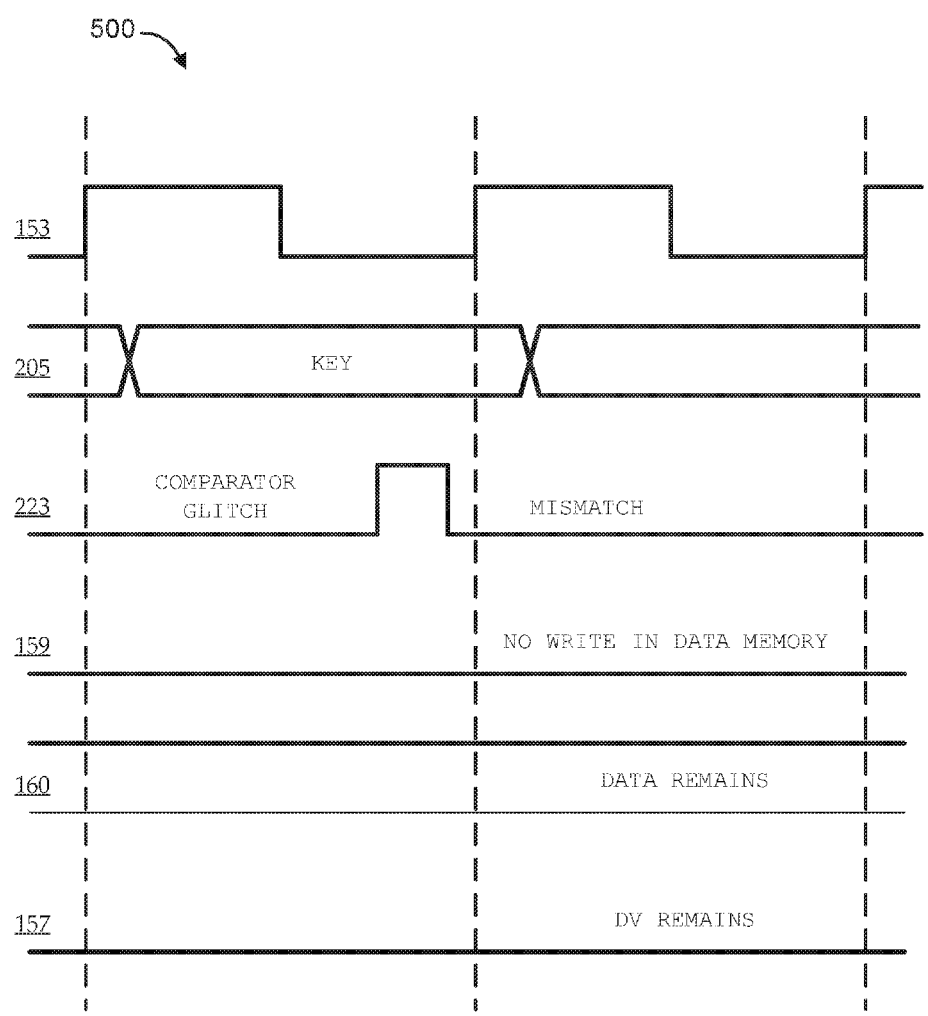
FIG. 5 illustrates signal timing for the memory update structure of FIG. 2 for a "mismatch" case without clock skew.

FIG. 5 illustrates signal timing 500 for the memory update structure 200 of FIG. 2 for a "mismatch" case without clock skew. As illustrated, FIG. 5 is similar to FIG. 3, except that the comparator result indicates a mismatch. In the illustrated case, although there is some glitch in the match signal 3, the match signal 223 is properly sampled as LOW at the start of the second clock unit interval. Accordingly, the write enable signal 159 and the data valid signal 157 are both LOW, and the pre-memory circuit 160 is not updated. As in FIG. 3, with no clock skew, the conventional memory update structure 200 can provide the correct result in such a case.

Figure 6:
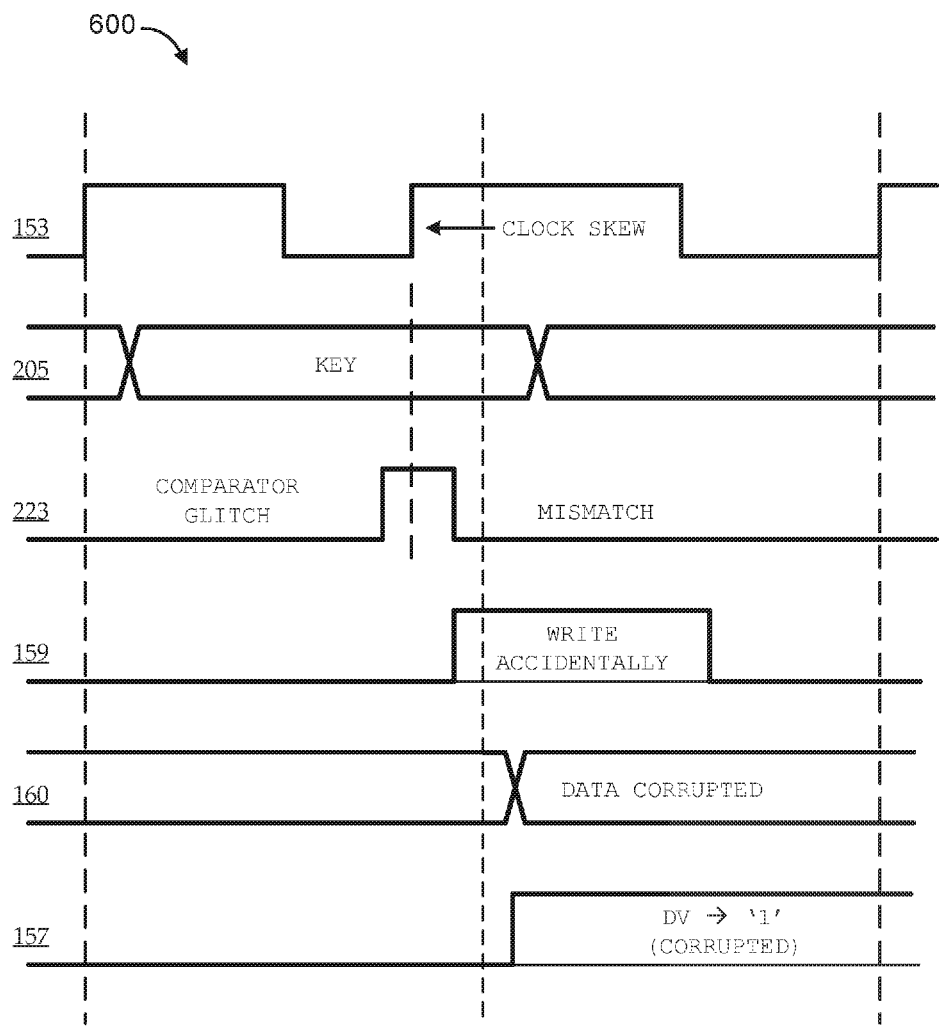
FIG. 6 illustrates signal timing for the memory update structure of FIG. 2 for a "mismatch" case with clock skew.

FIG. 6 illustrates signal timing 600 for the memory update structure 200 of FIG. 2 for a "mismatch" case with clock skew. As illustrated, FIG. 6 is similar to FIG. 5, except that clock skew causes the second clock unit interval to begin prematurely (as in FIG. 4). As in FIG. 5, there is a glitch in the match signal 223. Because of the skewed-early start of the second clock unit interval, the match signal 223 is sampled during the glitch, resulting in a false HIGH. Accordingly, in the second clock unit interval, the write enable signal 159 and the data valid signal 157 both go HIGH, causing the pre-memory circuit 160 to be updated incorrectly, and causing that update data 165 to be considered valid. As in FIG. 4, this can result in a memory update failure (e.g., data can be incorrectly validated and written to cache because of the clock skew).

Figure 7:
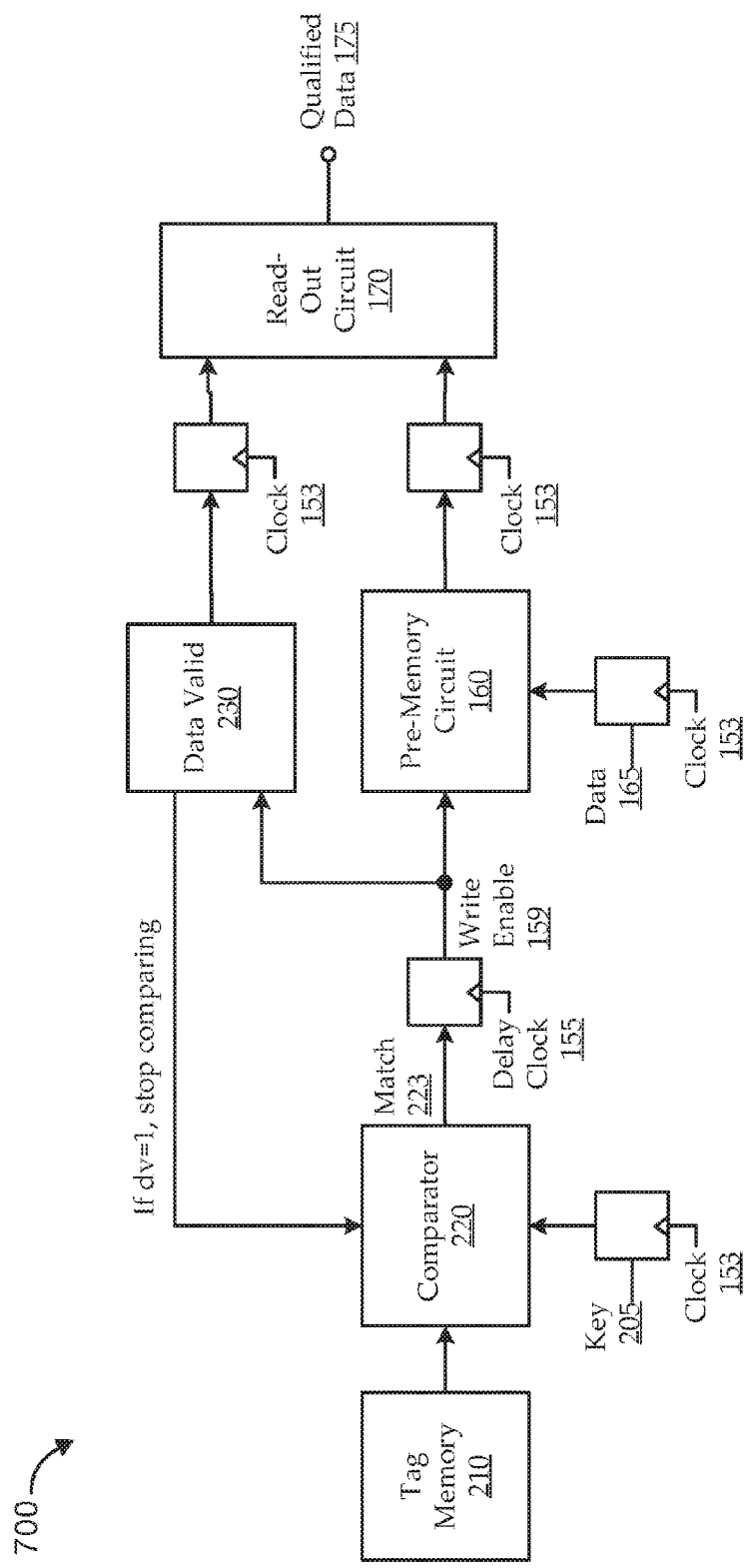
FIG. 7 shows another illustrative conventional memory update structure that uses a delayed clock signal.

As illustrated by the above, memory update failures can result at times from clock skew when the clock signal 153 used for writing and validating of update data 165 triggers those operations too early. Accordingly, some conventional implementations use a delayed clock instead. FIG. 7 shows another illustrative conventional memory update structure 700 that uses a delayed clock signal 155. As illustrated, various functions of the memory update structure 700 can be triggered by a clock signal 153, but the writing and validating of update data 165 is triggered by the delayed clock signal 155. As in FIG. 2, before updating the cache with the update data 165, the memory update structure 200 can be used to validate that the memory location indicator matches the particular memory location associated with the cache location being updated. For example, a comparator 220 can compare a received key 205 with a value received from a tag memory 210 to make such a determination. If the location indicated by the key 205 matches the value provided by the tag memory 210, a match signal 223 output of the comparator 220 can indicate a match (e.g., '1'). Otherwise, the match signal 223 output can indicate no match (e.g., '0').

In a next clock unit interval and after some delay (i.e., at a next rising clock edge of the delayed clock signal 155), the match signal 223 can update a write enable signal 159 as an input to a pre-memory circuit 160, and a data valid signal 157 as an input to a data valid circuit 230. When the write enable signal 159 is HIGH (i.e., when a match was detected by the comparator 220), the pre-memory circuit 160 is updated with the update data 165 (un-validated). When the data valid signal 157 is HIGH (i.e., when a match was detected by the comparator 220), the data valid circuit 230 can output a data valid indication (e.g., dv='1'). In some implementations, when there is a data valid indication, the comparator 220 operation can be suspended (e.g., until the next memory update interval). At a next clock unit interval, the ram-validated update data 165 and the data valid signal 157 can be provided to a read-out circuit 170, which can effectively read out the un-validated update data 165 from the pre-memory circuit 160 as validated data 175 when the data valid signal 157 indicates validity.

Figure 8:
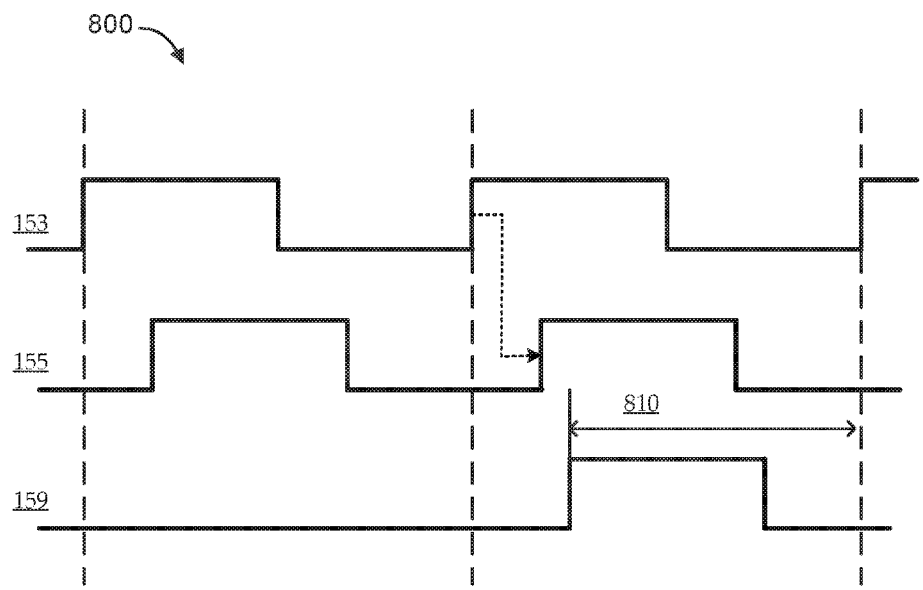
FIG. 8 illustrates signal timing 800 for the memory update structure of FIG. 7 for a "match" case without clock skew.
Figure 9:
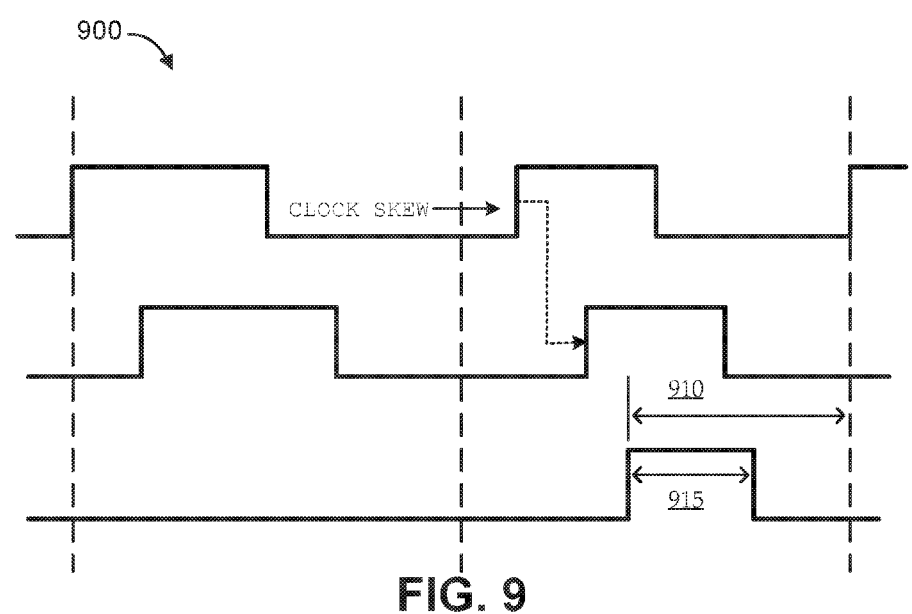
FIG. 9 illustrates signal timing for the memory update structure of FIG. 7 for a "match" case with clock skew.

While such a conventional memory update structure 700 can operate reliably in some contexts, it, like the memory update structure 200 of FIG. 2, may not be robust to certain clock skew, particularly at high data rates. For example, while the memory update structure 200 of FIG. 2 may be susceptible to a clock skewing early, the memory update structure 700 of FIG. 7 may be susceptible to a clock skewing late. FIGS. 8 and 9 show cases to illustrate such susceptibility. FIG. 8 illustrates signal timing 800 for the memory update structure 700 of FIG. 7 for a "match" case without clock skew. Two clock pulses are shown for a clock signal 153 and for a delayed clock signal 155. Though not shown, during a first clock unit interval, a key signal 205 is received, and a match is determined to be present, causing a match signal 223 to go HIGH. As shown in FIG. 7, the change in the match signal 223 does not propagate to a change in the write enable signal 159 or the data valid signal 157 until the start of a next delayed clock unit interval (e.g., a rising edge of the delayed clock signal 155). Waiting for the delayed clock signal 155 can effectively shift the start of updating the pre-memory circuit 160, reducing the time available in the second clock unit interval for the update to be carried out (as indicated by duration indication 810). Still, in such an instance, the memory can typically be updated properly.

FIG. 9 illustrates signal timing 900 for the memory update structure 700 of FIG. 7 for a "match" case with clock skew. FIG. 9 is similar to FIG. 8, except that clock skew causes the second clock unit interval to begin late (i.e., the rising edge of the clock signal 153 is shifted to the right), which also causes the second delayed clock unit interval to begin late. As illustrated by duration indication 910 and pulse width 915, the further delayed triggering of the write enable signal 159 further reduces the time available in the second clock unit interval for an update of the pre-memory circuit 160 to be carried out. As data rates increase, it can become increasingly difficult (or even impossible, in some cases) to perform certain memory update functions in the reduced timeframe. This can result in memory update errors.

Figure 10:
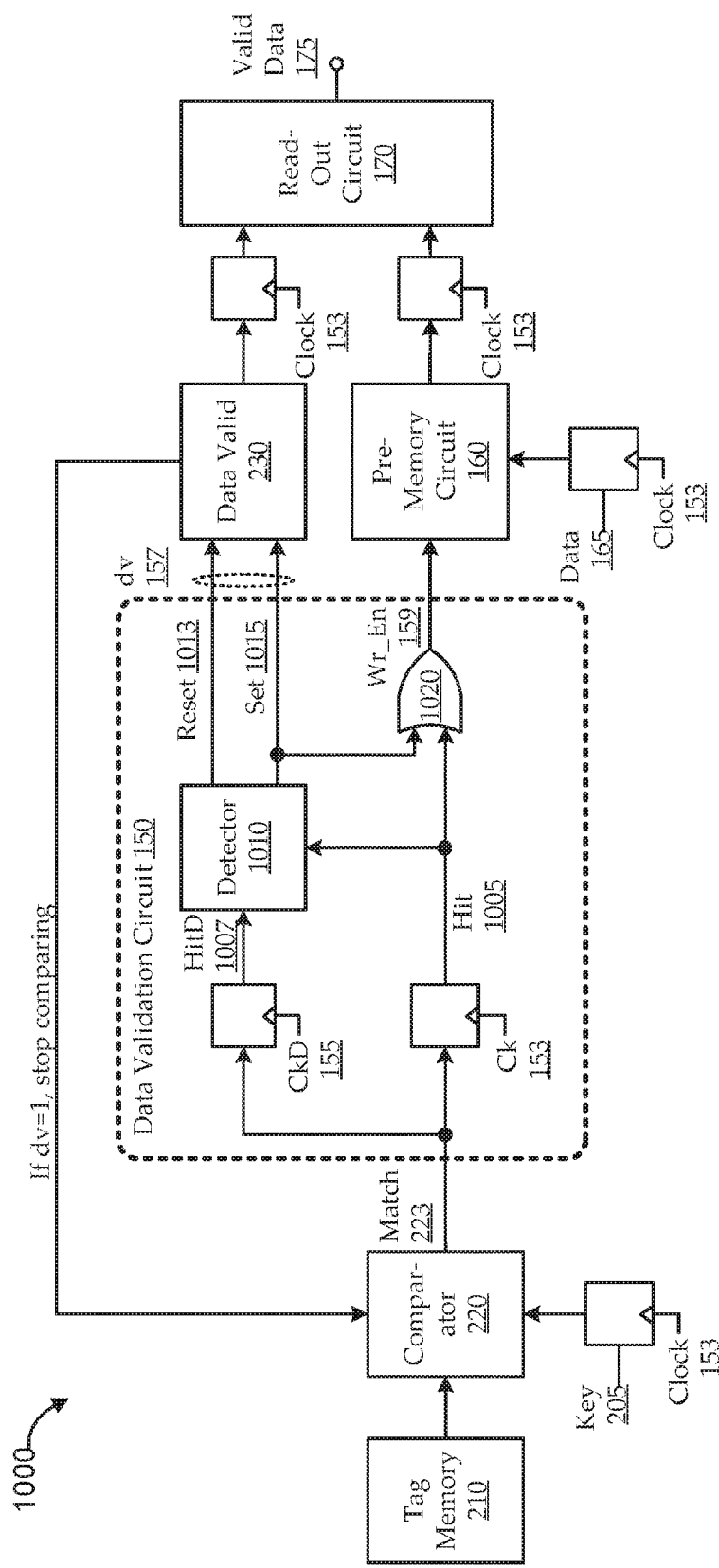
FIG. 10 shows a circuit block diagram of an illustrative memory update structure 1000, according to various embodiments.

FIG. 10 shows a circuit block diagram of an illustrative memory update structure 1000, according to various embodiments. As illustrated, most functions of the memory update structure 1000 can be triggered by a clock signal 153, but the data validation determination is triggered by a delayed clock signal 155. As described above, a tag memory 210 can be used to identify a particular memory location that is currently stored in a cache, or the like. Before updating the cache with the update data 165, the memory update structure 1000 can be used to validate that the memory location indicator matches the particular memory location associated with the cache location being updated by comparing (with comparator 220) a received key 205 with a value received from a tag memory 210. If the location indicated by the key 205 matches the value provided by the tag memory 210, a match signal 223 output of the comparator 220 can indicate a match (e.g., '1'). Otherwise, the match signal 223 output can indicate no match (e.g., '0').

The match signal 223 can be used by the data validation circuit 150 separately for writing update data 165 to a pre-memory circuit 160 and for making a data validation determination. As illustrated, a next pulse of the clock signal 153 (i.e., in a next clock unit interval of the clock signal 153) can update a hit indication 1005 according to the match signal 223 value (e.g., if the match signal 223 is HIGH, the hit indication 1005 is HIGH). Similarly, a next pulse of the delayed clock signal 155 (i.e., in a next clock pulse interval of the delayed clock signal 155) can update a delayed hit indication 1007 according to the match signal 223 value (e.g., if the match signal is HIGH the delayed hit indication 1007 is HIGH). In some implementations, the delayed hit indication 1007 can be used directly. In other implementations, the delayed hit indication 1007 (and the hit indication 1005, in some implementations) can be an input to a detector circuit 1010, which can output a set indication 1015 and a reset indication 1013 according to the delayed hit indication 1007 (i.e., when the delayed hit indication 1007 is HIGH, the set indication 1015 is HIGH and the reset indication 1013 is LOW; when the delayed hit indication 1007 is LOW, the set indication 1015 is LOW and the reset indication 1013 is HIGH). Use of the detector circuit 1010 (as opposed to using the delayed hit indication 1007 directly) can provide certain features, such as facilitating more explicit writing of the data valid signal 157 as either a HIGH or LOW indication. Regardless of whether the delayed hit indication 1007 is used directly, or the particular implementation of a detector circuit 1010, a data valid circuit 230 is updated (e.g., a "dv" bit is ultimately set) in accordance with the delayed hit indication 1007 (i.e., the data validation determination is effectively delayed). In some implementations, when there is a data valid indication, the comparator 220 operation can be suspended (e.g., until the next memory update interval).

As described above, the match signal 223 can also be used to trigger updating of the pre-memory circuit 160 with the update data 165. While the data validation determination can be triggered in a delayed manner by the delayed clock signal 155 (i.e., by the delayed hit indication 1007 directly, or by the output of the detector circuit 1010), it can be desirable not to delay triggering of the pre-memory circuit 160 update (e.g., to help ensure sufficient time for the update to be completed). According to some embodiments, the pre-memory circuit 160 updating can be enabled by a write enable signal 159, which can be triggered as soon as either the hit indication 1005 or the delayed hit indication 1007 (e.g., or the set indication 1015) goes HIGH. As illustrated, in one implementation, the hit indication 1005 and the set indication 1015 can be inputs to an OR gate 1020, and the output of the OR gate 1020 can be the write enable signal 159.

When the write enable signal 159 is HIGH (i.e., indicating that a match was detected by the comparator 220 with reference to either the clock signal 153 or the delayed clock signal 155), the pre-memory circuit 160 is updated with the update data 165 (un-validated). When the data valid signal 157 is HIGH (i.e., when a match was detected by the comparator 220 at least with reference to the delayed clock signal 155), the update data 165 in the pre-memory circuit 160 can be considered as valid. At a next clock unit interval, the un-validated update data 165 and the data valid signal 157 can be provided to a read-out circuit 170, which can effectively read out the un-validated update data 165 from the pre-memory circuit 160 as validated data 175 when the data valid signal 157 indicates validity.

As described above, some conventional approaches (e.g., as described with reference to FIGS. 2-6) can tend to have limitations when the clock skews early (e.g., missing a hit determination). Certain conventional approaches can seek to address this concern by delaying triggering of update functions; but such delays tend to leave too little time for memory updates (e.g., particularly with high data rates and/or when the clock skews late) (e.g., as described with reference to FIGS. 7-9). Embodiments described herein, including the memory update structure 1000 of FIG. 10, can delay the data validation determination without delaying triggering of the data update. For the sake of illustration, four cases can be explored. In a first case, the hit indication 1005 is LOW and the delayed hit indication 1007 is LOW, resulting in no memory update and no data validation (i.e., the write enable signal 159 is LOW and the data valid signal 157 is LOW), as desired. In a second case, the hit indication 1005 is HIGH and the delayed hit indication 1007 is HIGH, resulting in a memory update and a data validation (i.e., the write enable signal 159 is HIGH and the data valid signal 157 is HIGH), as desired. In a third case, the hit indication 1005 is LOW and the delayed hit indication 1007 is HIGH, resulting in a memory update and a data validation (i.e., the write enable signal 159 is HIGH and the data valid signal 157 is HIGH). Such a case may result, for example, from the clock skewing early, such that the non-delayed hit indication 1005 misses the transition of the match signal 223 to HIGH (the transition is still captured by the delayed clock signal 155). In a fourth case, the hit indication 1005 is HIGH and the delayed hit indication 1007 is LOW, which can result in a memory update and no data validation (i.e., the write enable signal 159 is HIGH and the data valid signal 157 is LOW). Such a case may result, for example, from the clock skewing early with a comparator glitch, or some other circumstance where the hit indication 1005 incorrectly detects a match. In such a case, even though the pre-memory circuit 160 updates, the data will not be validated and will not be read out by the read-out circuit 170.

Figure 11:
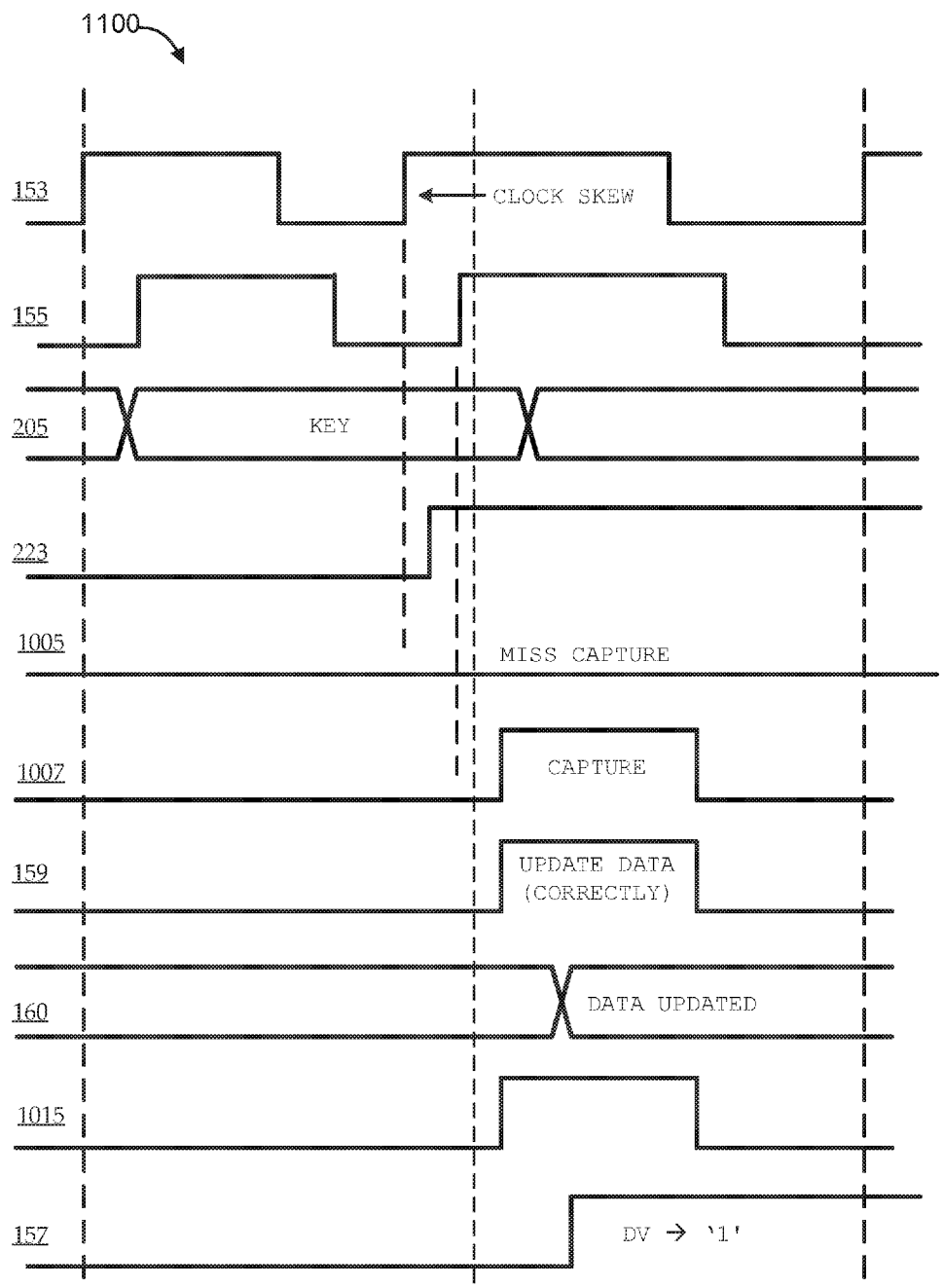
FIG. 11 illustrates signal timing for a "match" case with clock skew, according to various embodiments.
Figure 12:
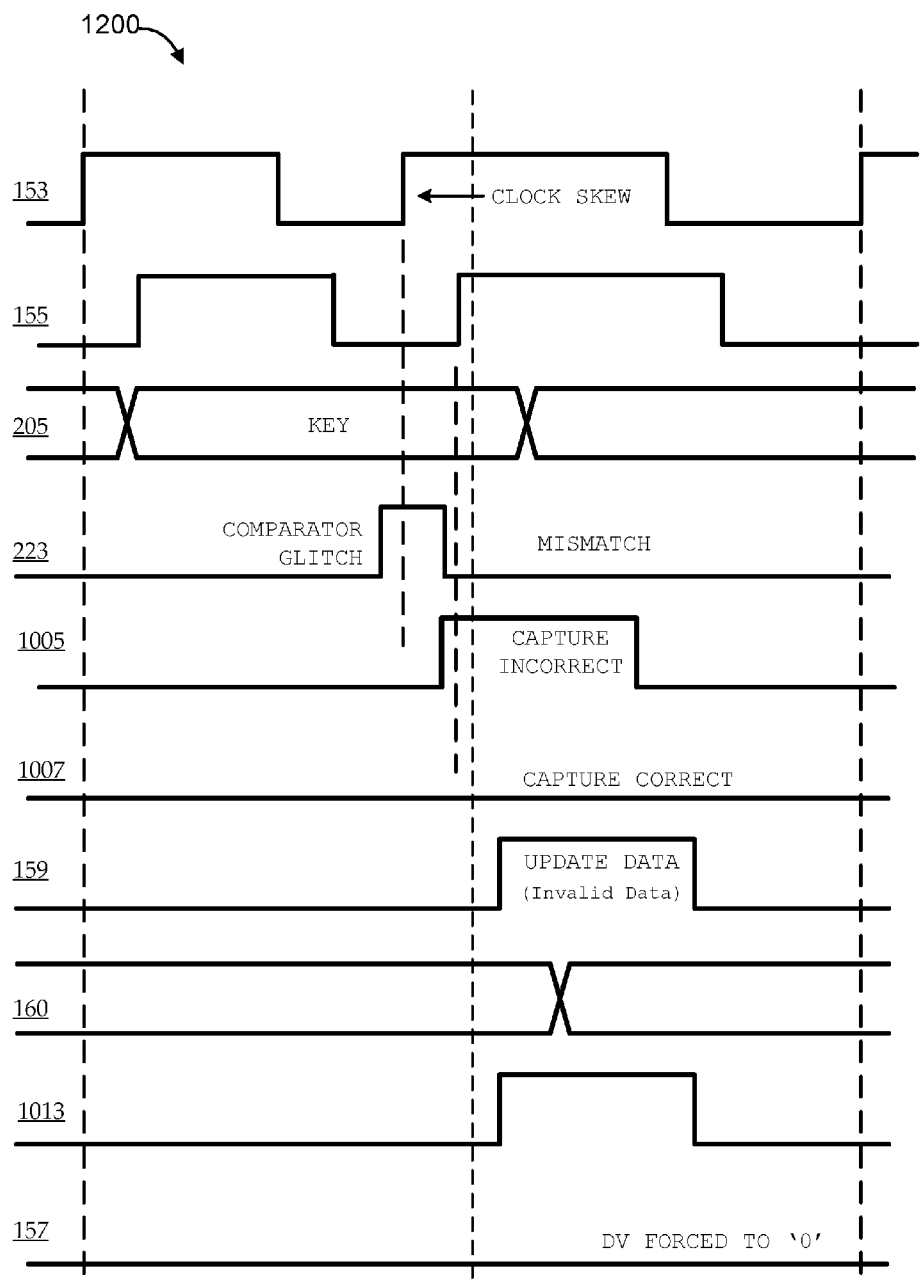
FIG. 12 illustrates signal timing for a "mismatch" case with clock skew.
Figure 13:
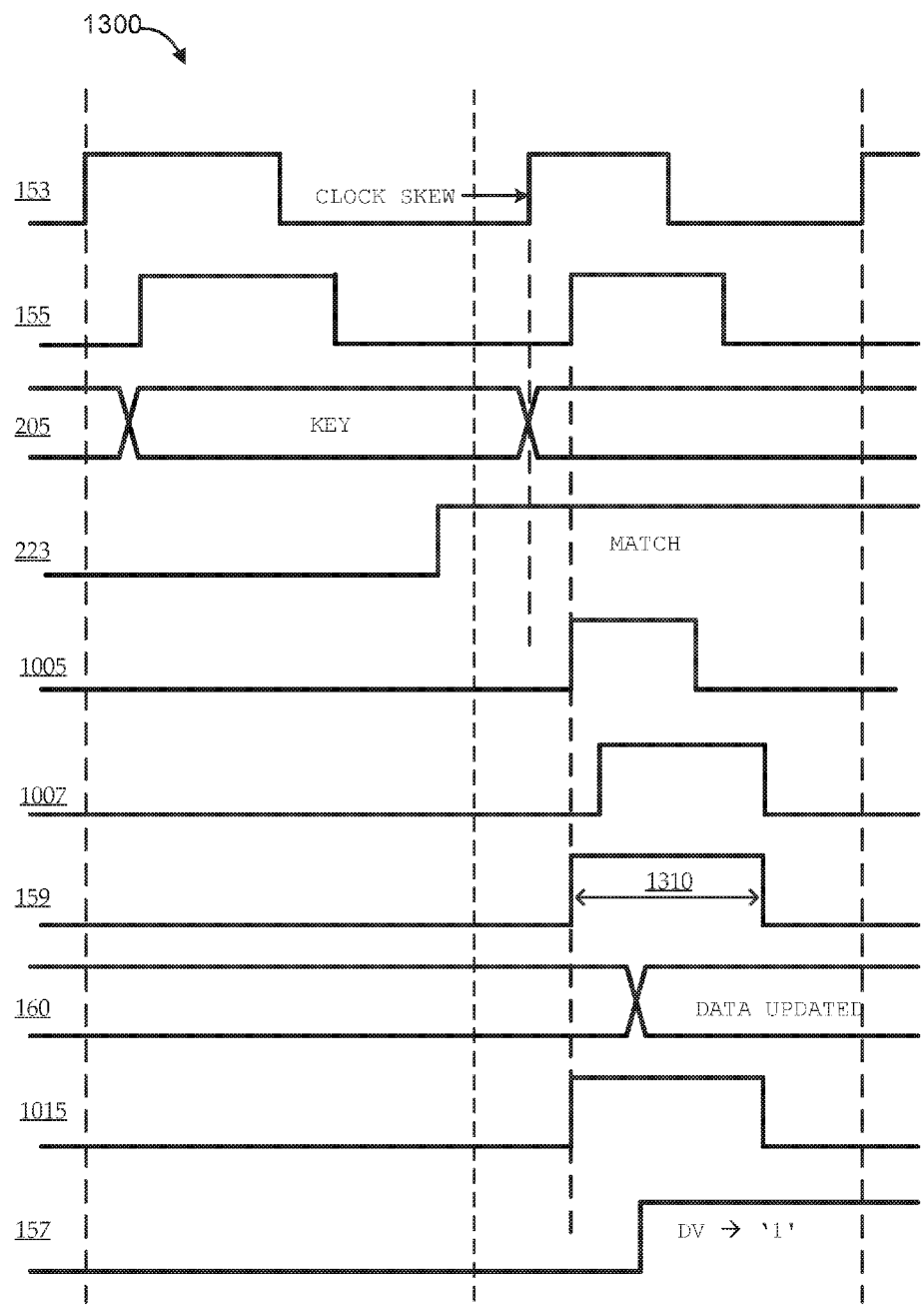
FIG. 13 illustrates signal timing for a "mismatch" case with backend clock skew.

FIGS. 11-13 further illustrate operations of a memory update structure implemented according to embodiments described herein, such as memory update structure 1000 of FIG. 10. FIG. 11 illustrates signal timing 1100 for a "match" case with clock skew, according to various embodiments. Two clock unit intervals are shown for clock signal 153 (two clock pulses) and for delayed clock signal 155. As illustrated, clock skew causes the second clock unit interval to begin prematurely (i.e., the corresponding rising edges of the clock signal 153 and the delayed clock signal 155 are shifted to the left), so that the first clock unit interval is shorter than nominal and the second clock unit interval is longer than nominal. During the first clock unit interval, a key signal 205 is received, and there is a match, as indicated by match signal 223 going HIGH. Because of the skewed-early start of the second clock unit interval, the match signal 223 transitions to HIGH after the beginning of the second clock unit interval of the clock signal 153, but before the second clock unit interval of the delayed clock signal 155. Accordingly, as shown, the hit indication 1005 misses the transition of the match signal 223 and indicates no match; but the delayed hit indication 1007 properly reflects the transition of the match signal 223 and indicates a match (i.e., the hit indication 1005 stays LOW, and the delayed hit indication 1007 goes HIGH). Because the write enable signal 159 is triggered by a HIGH on either the hit indication 1005 or the delayed hit indication 1007, the write enable signal 159 goes HIGH and the pre-memory circuit 160 is properly updated with un-validated update data 165. Further, the delayed hit indication 1007 triggers the set indication 1015 to go HIGH, thereby properly setting the data valid signal 157 to HIGH. Accordingly, the updated pre-memory circuit 160 data is validated and can be read out as validated data. This illustrates that such an implementation (e.g., memory update structure 1000) can operate correctly even with the clock signal 153 skewed early.

FIG. 12 illustrates signal timing 1200 for a "mismatch" case with clock skew. FIG. 12 is similar to FIG. 11, except that the comparator result indicates a mismatch and also includes a glitch during the first clock unit interval. As shown, the comparator glitch can manifest as a glitch in the match signal 223 that spans the skewed-early start of the second clock unit interval of the clock signal 153. Accordingly, the hit indication 1005 sees the glitch in the match signal 223 and incorrectly indicates a match; but the delayed hit indication 1007 misses the glitch and correctly samples the match signal 223 as a no-match condition (i.e., the hit indication 1005 goes HIGH, and the delayed hit indication 1007 stays LOW). In such a case, the write enable signal 159 may be triggered to transition to HIGH, which can cause the pre-memory circuit 160 to update with invalid data. However, the LOW delayed hit indication 1007 can still generate the correct detector circuit 1010 output (the reset indication 1013 is shown as HIGH, or the set indication 1015 could be shown as LOW), which can effectively force the data valid signal 157 LOW. As such, the update data 165 will be treated as invalid and will not be read out. This illustrates that such an implementation (e.g., memory update structure 1000) can operate correctly even with the clock signal 153 skewed early and a comparator glitch.

FIG. 13 illustrates signal timing 1300 for a "mismatch" case with backend clock skew. FIG. 13 is similar to FIG. 11, except that backend clock signal 153 causes the second clock unit interval to begin late (i.e., the corresponding rising edges of the clock signal 153 and the delayed clock signal 155 are shifted to the right), so that the first clock unit interval is longer than nominal and the second clock unit interval is shorter than nominal. Because of the backend clock skew, both the indication 1005 and the delayed hit indication 1007 correctly sample the match signal 223 and indicate a match. Because the write enable signal 159 is triggered by either (e.g., the first of) the hit indication 1005 or the delayed hit indication 1007 (or the set indication 1015, etc.), triggering of the write enable signal 159 is delayed by the backend skew, but is not further impacted by delaying the delayed clock signal 155. As such, though the triggering of the write enable signal 159 is delayed, a sufficient pulse width remains during which to perform the update of the pre-memory circuit 160, as indicated by pulse width 1310. Further, the set indication 1015 is correctly triggered to go HIGH, thereby setting the data valid signal 157 to HIGH. In the illustrated implementation, the set indication 1015 is triggered to go HIGH effectively by the hit indication 1005 (i.e., the set indication 1015 is HIGH when either or both of the hit indication 1005 and the delayed hit indication 1007 are high). In other implementations, the set indication 1015 is triggered only by the delayed hit indication 1007, so that the data valid signal 157 is effectively tied only to the delayed hit indication 1007.

The various systems, subsystems, and components described above can be implemented in any suitable manner, and the various operations of methods and functions of certain system components can be performed by any suitable means capable of performing the corresponding functions. For example, various functions described with reference to a particular subsystem or component can be performed by a different component, a combination of components, and/or in any other suitable manner. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 14:
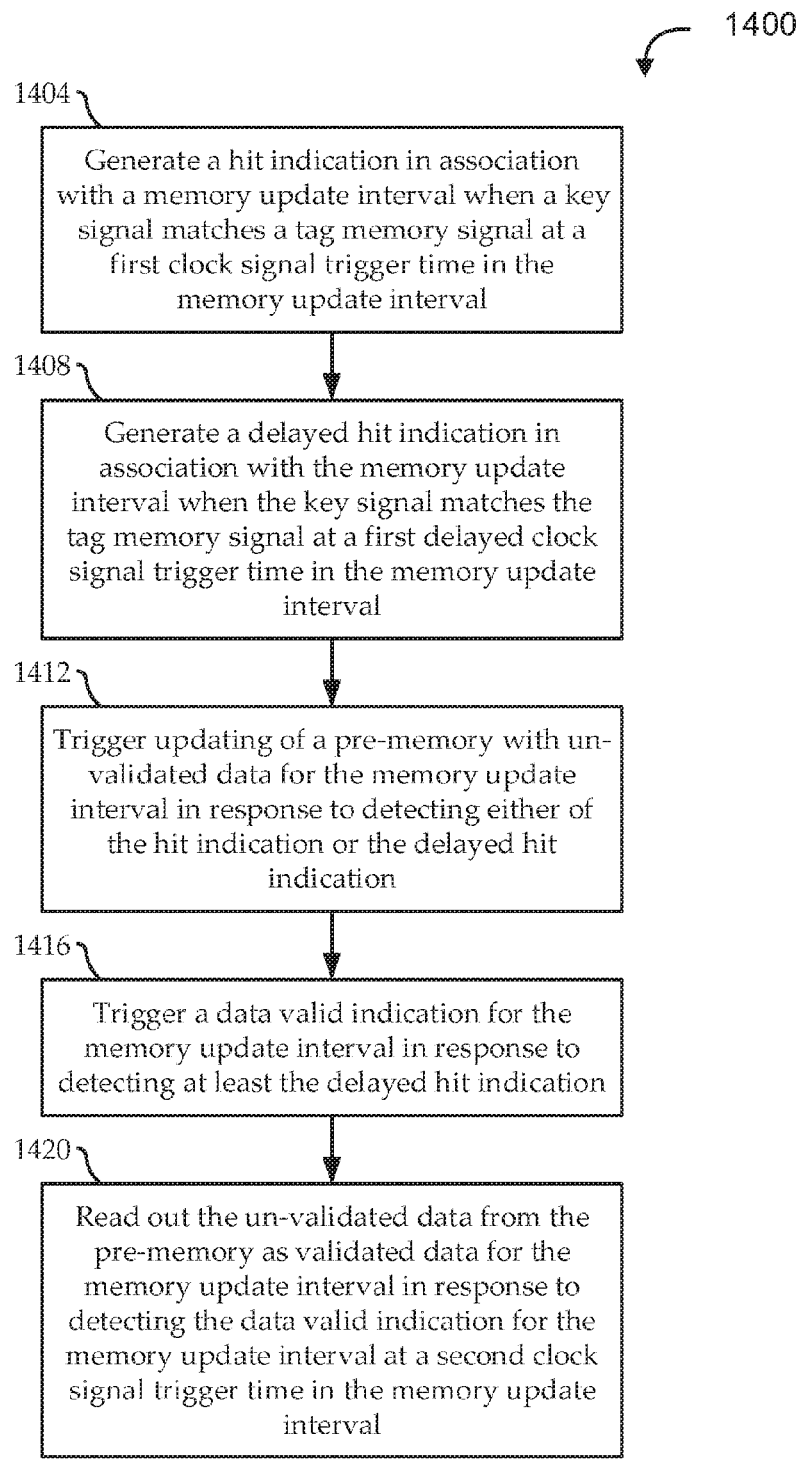
FIG. 14 shows a flow diagram of an illustrative method for clock-skew-tolerant memory updating, according to various embodiments.

FIG. 14 shows a flow diagram of an illustrative method 1400 for clock-skew-tolerant memory updating, according to various embodiments. Embodiments of the method 1400 begin at stage 1404 by generating a hit indication (e.g., setting a hit indication signal or a hit indication bit to HIGH) in association with a memory update interval when a key signal matches a tag memory signal at a first clock signal trigger time (e.g. a rising clock edge) in the memory update interval. At stage 1408, embodiments can generate (e.g., set a delayed hit indication signal or a delayed hit indication bit to HIGH) a delayed hit indication in association with the memory update interval when the key signal matches the tag memory signal at a first delayed clock signal trigger time in the memory update interval. For example, some implementations can receive the tag memory signal and the key signal and can compare the tag memory signal and the key signal in association with the memory update interval to generate a match output signal. In such implementations, the hit indication and the delayed hit indication can be generated according to the match output signal.

At stage 1412, embodiments can trigger updating of a pre-memory with un-validated data for the memory update interval in response to detecting either of the hit indication or the delayed hit indication. At stage 1416, embodiments can trigger a data valid indication (e.g., set a data validation signal or a data validation bit to HIGH) for the memory update interval in response to detecting at least the delayed hit indication. As one example, when the hit indication is detected and the delayed hit indication is detected (e.g., in a normal match case, for example, without clock skew; in a match case with backend skew; etc.), the updating of the pre-memory can be triggered upon detection of the hit indication, and the data valid indication can be triggered upon detection of the hit indication. Alternatively, when the hit indication is detected and the delayed hit indication is detected, the updating of the pre-memory can be triggered upon detection of the hit indication, and the data valid indication can be triggered upon detection of the delayed hit indication. As another example, when the hit indication is not detected and the delayed hit indication is detected (e.g., in a match case impacted by clock skew), the updating of the pre-memory can be triggered upon detection of the delayed hit indication, and the data valid indication can be triggered upon detection of the delayed hit indication. As another example, when the hit indication is detected and the delayed hit indication is not detected (e.g., in a mismatch case with a comparator glitch), the updating of the pre-memory can be triggered upon detection of the hit indication, and the data valid indication may not be triggered. As another example, when the hit indication is not detected and the delayed hit indication is not detected (e.g., in a normal mismatch case), the updating of the pre-memory may not be triggered, and the data valid indication may not be triggered. At stage 1420, embodiments can read out the un-validated data from the pre-memory as validated data for the memory update interval in response to detecting the data valid indication for the memory update interval at a second clock signal trigger time in the memory update interval.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A memory update structure comprising:
    a data validation sub-structure having:
    a clock signal input;
    a delayed clock signal input that is a delayed version of the clock signal input;
    a match signal input that is HIGH when a tag memory signal matches a key signal, and is LOW otherwise;
    a write enable signal output; and
    a data valid signal output,
    wherein, in a given memory update interval of the clock signal input:
    the write enable signal output is triggered HIGH in response to the match signal being HIGH at a trigger time of either the clock signal input or the delayed clock signal input;
    the data valid signal output is HIGH when the match signal is HIGH at the trigger time of at least the delayed clock signal input, and
    wherein the memory update structure further comprises:
        a detector sub-structure having:
        a hit input that is HIGH when the match signal is HIGH at the trigger time of the clock signal input, and is LOW otherwise;
        a delayed hit input that is HIGH when the match signal is HIGH at the trigger time of the delayed clock signal input, and is LOW otherwise;
        a set output that is HIGH only when at least the delayed hit input is HIGH; and
        a reset output that is HIGH only when at least the delayed hit input is LOW,
        wherein the data valid signal output is a function of the set output and the reset output.

2. The memory update structure of claim 1, further comprising:
    a read-out sub-structure having:
    a data valid signal input coupled with the data valid signal output; and
    a valid data output corresponding to validated update data for the memory update interval when the data valid signal input is HIGH for the memory update interval.

3. The memory update structure of claim 2, further comprising:
    a pre-memory sub-structure having:
    a write enable signal input coupled with the write enable signal output;
    an un-validated data input; and
    a memory updated according to the un-validated data input in response to the write enable signal input being triggered HIGH for the memory update interval,
    wherein the pre-memory sub-structure is coupled with the read-out sub-structure, and the validated update data is read from the memory.

4. The memory update structure of claim 1, further comprising:
    a comparator sub-structure having:
    a tag memory input coupled with the tag memory signal;
    a key signal input coupled with the key signal; and
    a match signal output coupled with the match signal input, the match signal output being HIGH when the tag memory input matches the key signal input, and being LOW otherwise.

5. The memory update structure of claim 1, wherein, in a given memory update interval of the clock signal input:
    when the match signal is HIGH at the trigger time of the clock signal input, and the match signal is HIGH at the trigger time of the delayed clock signal input,
    the write enable signal output is triggered HIGH in response to the match signal being HIGH at the trigger time of the clock signal input; and
    the data valid signal output is triggered HIGH in response to the match signal being HIGH at the trigger time of the clock signal input.

6. The memory update structure of claim 1, wherein, in a given memory update interval of the clock signal input:
    when the match signal is HIGH at the trigger time of the clock signal input, and the match signal is LOW at the trigger time of the delayed clock signal input,
    the write enable signal output is triggered HIGH in response to the match signal being HIGH at the trigger time of the clock signal input; and
    the data valid signal output is forced LOW in response to the match signal being LOW at the trigger time of the delayed clock signal input.

7. The memory update structure of claim 1, wherein, in a given memory update interval of the clock signal input:
    when the match signal is LOW at the trigger time of the clock signal input, and the match signal is HIGH at the trigger time of the delayed clock signal input,
    the write enable signal output is triggered HIGH in response to the match signal being HIGH at the trigger time of the delayed clock signal input; and
    the data valid signal output is triggered HIGH in response to the match signal being HIGH at the trigger time of the delayed clock signal input.

8. The memory update structure of claim 1, wherein, in a given memory update interval of the clock signal input:
    when the match signal is LOW at the trigger time of the clock signal input, and the match signal is LOW at the trigger time of the delayed clock signal input,
    the write enable signal output is not triggered HIGH; and
    the data valid signal output is not triggered HIGH.

* * * * *

UNITED STATES PATENT AND TRADEMARK OFFICE
CERTIFICATE OF CORRECTION

PATENT NO. : 9,928,007 B2  
APPLICATION NO. : 15/184776  
DATED : March 27, 2018  
INVENTOR(S) : Lee et al.

Page 1 of 1

It is certified that error appears in the above-identified patent and that said Letters Patent is hereby corrected as shown below:

In the Specification

In Column 1, Line 26, after "dimensions" insert -- (e.g., --.

In Column 3, Line 42, after "transition" insert -- (e.g., --.

In Column 5, Line 33, delete "rates," and insert -- rates. --, therefor.

In Column 6, Line 8, delete "3," and insert -- 223, --, therefor.

In Column 6, Line 65, delete "ram-validated" and insert -- un-validated --, therefor.

In Column 8, Line 4, delete "HIGH" and insert -- HIGH, --, therefor.

Signed and Sealed this  
Fourth Day of September, 2018

Andrei Iancu  
*Director of the United States Patent and Trademark Office*